Figure 1:
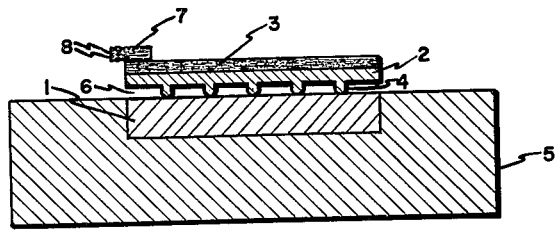

June 23, 1964  G. R. COWAN ETAL  3,137,937
EXPLOSIVE BONDING

Filed Oct. 26, 1960  2 Sheets-Sheet 1

INVENTORS
GEORGE R. COWAN
JOHN J. DOUGLASS
ARNOLD H. HOLTZMAN
BY Jules H. Steinberg
ATTORNEY June 23, 1964  G. R. COWAN ETAL  3,137,937
EXPLOSIVE BONDING
Filed Oct. 26, 1960  2 Sheets-Sheet 2

INVENTORS
GEORGE R. COWAN
JOHN J. DOUGLASS
ARNOLD H. HOLTZMAN
BY Jules H. Steinberg
ATTORNEY

United States Patent Office 3,137,937
Patented June 23, 1964

3,137,937
EXPLOSIVE BONDING
George R. Cowan, Woodbury, John J. Douglass, Glassboro, and Arnold H. Holtzman, Woodbury, N.J., assignors to E. I. du Pont de Nemours and Company, Wilmington, Del., a corporation of Delaware
Filed Oct. 26, 1960, Ser. No. 65,194
12 Claims. (Cl. 29—486)

The present invention relates to a novel process for bonding of metals. Specifically, the invention involves a method for bonding metal surfaces and in particular for cladding a metal surface with one or more layers of the same or another metal and to novel articles of manufacture which are produced by this process. This application is a continuation-in-part of our prior application, Serial No. 6,793, filed February 4, 1960, now abandoned.

The use of clad, or composite, metals as materials of construction has become, in recent years, a well-established practice. Such clad materials consist of a base metal, usually relatively inexpensive, to the surface of which is bonded or clad a layer of a second metal which possesses certain desirable properties, e.g., high corrosion or oxidation resistance, not characteristic of the base metal. In most instances, the metal which forms the cladding layer is considerably more costly than is the base metal to which it is applied. Hence a considerable economic saving is made possible by the use of a thin layer rather than a thick layer of the costly metal. Naturally, this saving is greatly increased when clad materials are employed in the construction of large pieces of equipment such as pipe lines, storage tanks, and processing vessels for large chemical plants.

A second advantageous feature of the use of clad metals results from the fact that frequently the metal possessing the desired corrosion resistance or other property is lacking in the necessary tensile strength, thermal properties, or compression strength to enable it to be employed per se in applications where stress will be encountered. Thus, in addition to the economy provided by the use of the less expensive metal, the structural strength and rigidity which it may impart to the composite system represent an important and valuable factor in composite assemblies.

In addition to the aforementioned uses for clad or composite metals, this invention has specific application to, among others, X-ray equipment, cooking vessels, and decorative trim for automobiles and buildings. For example, in many cases, it would be desirable to protect such metals as molybdenum, tungsten, and their alloys, which are primarily used for high temperature applications, by a layer of an oxidation resistant material such as "Nichrome."

A variety of methods exist for bonding one metal to the surface of another to form a composite multilayered assembly; however, each of these methods suffers from certain disadvantages which cause them to be disadvantageous or wholly unsuitable, under certain circumstances.

The oldest of the commercial processes for applying a layer of a metal to another metal is that commonly known as "hot-dipping," or when applied to zinc coatings, "galvanizing." Essentially, the method consists of immersing the article to be coated in a bath of molten metal for a short time. It is necessary for successful coating that the two metals alloy with each other at least to some extent. The disadvantages of the hot-dipping method are: (1) it is difficult to control accurately the thickness of the outer layer or its distribution over the surface; and (2) certain metals do not alloy with others, or alternately form deleterious brittle phases, which makes the production of a continuous layer with combinations of such metals impossible from a practical standpoint. Owing to the difficulties associated with the handling of large quantities of molten metals of high melting points, for example, copper, nickel, tungsten, and cobalt, as well as the possibility of causing undesirable thermal changes in the base metal, the hot-dipping method has been severely limited to the application of metals of relatively low melting points.

Another well-known process for applying a layer of one metal to another is electroplating. In this process, the article to be plated, after careful cleaning, is immersed in a solution of a compound of the metal of which a coating is desired, and subsequently an electric current is passed through the solution, the object to be plated serving as the cathode. In electroplating, adherent layers are obtainable whose thickness is easily controlled, and the deposited layer generally is of high purity. However, the process is time-consuming and expensive, and, additionally, porosity of the deposited layer and embrittlement problems arising from the hydrogen produced impose serious limitations on the use of electro-deposited coatings for many applications. Moreover, the process is not readily adaptable to depositing coatings from alloys.

Vapor deposition is a third process for applying a layer of one metal to another, but this technique has found use in a limited number of situations because of the costly special procedures and exacting control required. The coatings produced by the process are generally adherent, flexible, and of a high degree of purity. Some elements such as silicon, tellurium, and selenium, which are difficult to deposit by other methods, can be vapor deposited.

A forth and more common method of bonding one metal to another involves direct rolling of one layer onto another with the application of heat and pressure. Although several variations of this roll-cladding technique are used commercially for the production of clad sheets, wires, strips, and so forth, all suffer from certain serious shortcomings. First, the process is limited as to those metals that can form an effective bond under the pertinent conditions. Indeed, there are some combinations of metals, for example, tungsten and niobium, for which none of the bonding processes presently known is efficacious. Second, under the extreme temperature conditions required for effective hot rolling, highly undesirable, brittle intermetallic compounds often are formed or other undesirable effects, such as adsorption of embrittling agents from the surrounding atmosphere, often occur. Hence, a further disadvantage of direct rolling results because costly and difficult techniques, such as gas-tight welding, inert or evacuated atmospheres, and elaborate rolling machinery are required.

Thus, a primary object of the present invention is to provide a process for bonding metal surfaces to each other. A further object is to provide a means whereby virtually any two or more metals or metal alloys may be bonded together a form a composite multilayered system. A still further object of the invention is the provision of clad metal systems wherein the cladding layer is nonpervious, uniform, and adherent, by a method that is convenient and economical. A still further object of this invention is to provide unique clad assemblies from metals which heretofore could not be bonded effectively together. As the invention is described, other objects will become evident.

We have found that the above-described objects are achieved when we support a layer of cladding metal parallel to a surface of a metal to be clad, the inside surface of said layer of cladding metal being spaced from the surface of said metal to be clad, place on the outer surface of said layer of cladding metal a layer of a detonating explosive having a velocity of detonation less than 120% of the velocity of sound in that metal in the system having the highest sonic velocity, and thereafter initiate said explosive layer. Usually it is desirable to use an explosive having a detonation velocity not greater than the velocity of sound in that metal with the higher sonic velocity, and this represents the preferred embodiment of the invention.

The metal layers must be separated from each other a distance at least sufficient for the explosively propelled layer to achieve an adequate velocity before impact with the stationary layer. A spacing of 0.001 inch between the facing surfaces of the two layers represents the minimum spacing which we have found will consistently be adequate. The maximum separation allowable is dependent entirely upon the reduction of velocity of the propelled layer caused by air between the layers. By increasing the explosive loading or by evacuating the space between the layers, spacings much greater than 0.001 inch are feasible. In general, however, separation of more than 0.5 inch is not convenient or necessary.

Figure 2:
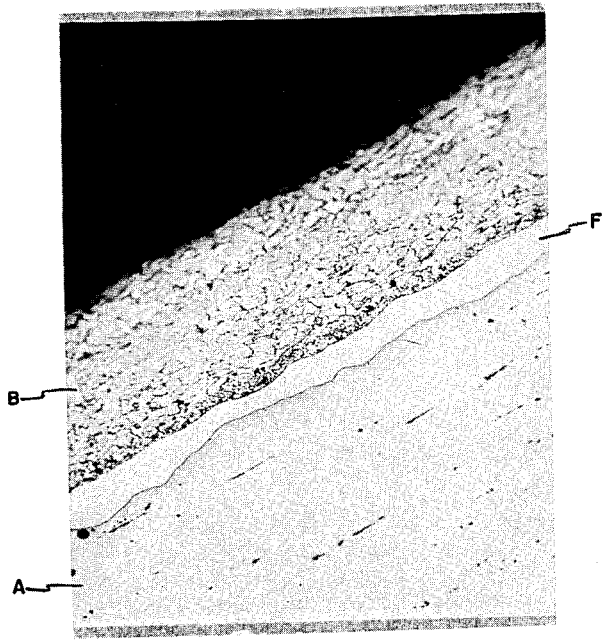
Figure 3:
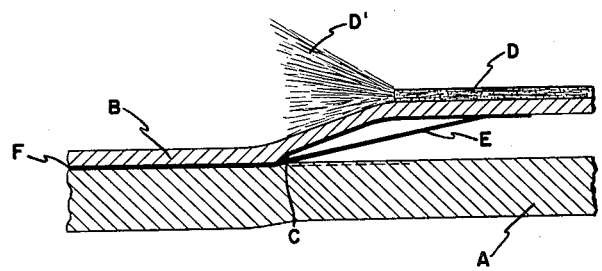
Figure 4:
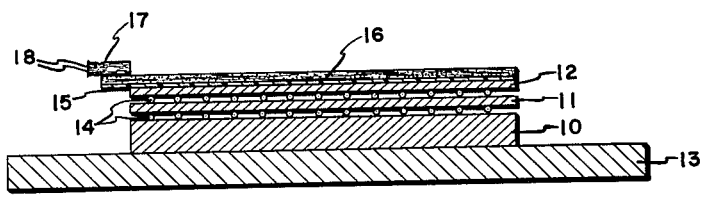

Reference is now made to the attached drawing for a more complete undertsanding of the invention in which FIGURE 1 represents a cross-sectional view of an assembly which may be used to practice the invention, FIGURE 2 is a photomicrograph (magnification of 450) of a bimetallic assembly prepared in accordance with the assembly, FIGURE 3 represents a schematic depiction of the phenomenon which is believed to occur in the course of the present process, and FIGURE 4 represents a typical assembly for the preparation of multilayered systems. In FIGURE 1, the metal layer to be clad is indicated by 1. The layer 1 is embedded in a supporting medium 5 of a hard gypsum cement. Cladding layer 2 is supported above base layer 1 by small dimples 4 in the surface of cladding layer 2. This provides the required spacing between the two layers indicated by 6. A layer of a detonating explosive 3 is positioned above and contiguous to layer 2, and to one edge of the explosive layer is attached initiator 7 having lead wires 8.

In the photomicrograph of FIGURE 2, A indicates a base layer of molybdenum, B indicates a cladding layer of low carbon steel, and F indicates the bonding zone composed of material from layers A and B.

In FIGURE 3, A represents the metal base layer, B represents the metallic cladding layer, D represents the layer of explosive before detonation, and D' represents the gaseous detonation products following detonation of layer D, E represents a sharp liquid stream of material composed of both layer A and layer B which impinges on the underside of layer B just ahead of the impact point C, and F represents the material immobilized between the layers A and B and bonding these layers together.

FIGURE 4 represents an assembly for the preparation of assemblies having more than two layers. Metal layer 10 which is to be clad by metal sheets 11 and 12 is resting on a plywood support 13. Metal layers 10, 11, and 12 are separated by a standoff space maintained by tiny metallic particles 14. A layer of tape, polystyrene foam, or other inert material 15 covers the upper surface of layer 12 to protect it from the direct effects of explosive layer 16. The explosive is initiated by initiator 17 attached at one corner of the explosive and having lead wires 18. Explosive layer 16 may extend somewhat beyond the topmost cladding layer to provide a convenient portion for attaching the initiator and to insure that the detonation front will have achieved maximum velocity when it is adjacent the edge of the cladding assembly.

The following examples illustrate some of the many combinations of metals that can be bonded together by the method of the present invention. They are intended as illustrative only, however, and are not to be considered as exhaustive or limiting. Any desired composite metallic system may be obtained by a suitable adjustment of conditions.

*Example 1*

The explosive employed in this example was a thin uniform sheet of a flexible explosive composition comprising 20% very fine pentaerythritol tetranitrate (PETN), 70% red lead, and, as a binder, 10% of a 50/50 mixture of butyl rubber and a thermoplastic terpene resin [mixture of polymers of β-pinene of formula $(C_{10}H_6)_n$], commercially available as "Piccolyte" S–10 (manufactured by the Pennsylvania Industrial Chemical Corporation). Complete details of this composition and a suitable method for its manufacture are disclosed in U.S. Patent No. 3,093,521. The composition is readily rolled into sheets and detonates at a velocity of about 4100 meters per second.

A mild steel plate, 6 inches by 9 inches and 0.5 inch thick, was placed on a plywood slab. Above this plate and spaced therefrom a distance of 0.125 inch by rectangular steel spacers at each corner was placed in corresponding dimensional alignment a 6 inch by 9 inch by 0.125 inch plate of stainless steel. The outer surface of this plate was covered with a layer of masking tape as a guard against marring of the final surface. A dimensionally conforming layer of the above-described explosive having a weight per unit area of 15 grams per square inch was placed over the layer of masking tape. A commercial line wave generator as described in U.S. Patent No. 2,943,571, issued July 5, 1960, was attached to one side of the rectangular explosive layer and subsequently initiated. After detonation of the explosive, the mild steel and the stainless steel were found to be firmly and uniformly bonded together to form a composite assembly. Microscopic examination revealed excellent bonding. Tests carried out according to prescribed A.S.T.M. Method No. A263–44T on the assembly to determine the shear strength of the bond gave an average shear strength of 73,500 p.s.i. The minimum shear strength prescribed by A.S.T.M. specifications for this type of clad is 20,000 p.s.i. and those produced by common conventional means usually exhibit a shear strength of from 30,000 to 35,000 p.s.i. The composite could be bent 180° around a mandrel whose diameter was equal to the thickness of the composite without fracture.

*Example 2*

A 24 inch by 24 inch by 0.75 inch plate of mild steel was placed on a supporting block of plywood. One surface of a 24 inch by 24 inch by 0.0313 inch sheet of type 304 stainless steel was covered with masking tape and was placed, tape-side up, on the mild steel plate and spaced therefrom a distance of 0.0059 inch by a few scattered particles of iron powder which had been sieved to pass through a No. 100 mesh screen and held on a No. 200 mesh screen. The surface of the tape was then covered completely with granular TNT at a distribution of 5.2 grams per square inch and a density of 0.8 gram per cubic centimeter. Initiation of the explosive was by a No. 6 electric blasting cap positioned at a corner of the layer. The layer of granular TNT detonated at a velocity of about 4200 meters per second. After detonation of the explosive, the resulting 24 inch by 24 inch stainless-on-mild steel composite displayed metallurgical properties comparable to those of the specimen prepared in Example 1.

*Example 3*

A 0.25-inch-thick nickel layer was applied to a 1-inch-thick plate of mild steel in the following manner. A 6 inch by 9 inch plate of mild steel was placed on a plywood support block. Particles of iron powder screened as in Example 2 were placed at intervals on the upper surface of the mild steel to provide a stand off distance of 0.0059 inch. One surface of the nickel cladding layer was covered with a protective layer of masking tape to insure against minor deformation or marking of the surface by the explosive force. The layer of tape was in turn covered with a layer of the explosive composition described in Example 1, having a weight per unit area of 30 grams per square inch, and the nickel-tape-explosive composite was placed, nickel-side-down and in dimensional alignment, on the steel plate. A No. 6 electric initiator was attached to one corner of the explosive layer, and the explosive was detonated. A nickel-mild steel assembly having excellent bonding of the two metallic layers was obtained.

Example 4

The technique and explosive composition of Example 3 were used to prepare a 3 inch by 3 inch composite of molybdenum-on-type 304 stainless steel. The thickness of the molybdenum cladding layer was 0.040 inch, and that of the stainless steel 0.0625 inch. The weight per unit area of the explosive layer used was 15 grams per square inch, and the standoff space provided was 0.0059 inch. An excellent clad was achieved.

Example 5

A 0.0625-inch layer of copper was clad onto a 0.5 inch-thick plate of mild steel in the following manner. The copper sheet which measured 3 inches by 6 inches was covered on one side with a one-inch-thick layer of polystyrene foam and the polystyrene layer was covered with a layer of the explosive composition of Example 1 having a weight distribution of 10 grams per square inch. The edges of the copper-polystyrene-explosive "sandwich" were sealed with waterproof tape, and the sandwich was placed on the mild steel plate with a spacing between the copper layer and the steel layer of 0.0138 inch provided by uniform particles of iron powder. The iron particles had been screened to pass through No. 45 mesh and were held on No. 100 mesh. The edges of the completed assembly also were sealed with tape, and an electric initiator was attached at one corner of the explosive layer. The assembly was then immersed in water, and the explosive was initiated. Excellent bonding of the copper onto the steel plate resulted.

Example 6

The procedure of Example 5 was used to prepare a titanium-on-copper clad. The dimensions of the sheets were 3 inches by 6 inches; the titanium layer was 0.050 inch thick and the copper layer was 0.0625 inch thick. The spacing, which in this case was provided by particles of screened titanium powder, was 0.0138 inch, and the weight of the explosive was 10 grams per square inch. Following detonation of the explosive, the titanium and copper sheets were firmly and uniformly bonded.

Example 7

A 0.050 inch titanium layer was clad to a 0.5 inch plate of mild steel by the procedure described in Example 5. The dimensions of the layers were each 3 inches by 6 inches, the weight of the explosive was 15 grams per square inch, and the spacing of 0.0017 inch was provided by uniform particles of iron powder (through No 325 mesh). The clad obtained was strong and uniform.

Example 8

The procedure of Example 5 again was employed to apply a 0.125-inch aluminum layer to a 0.5 inch plate of mild steel. The layers were each 3 inches by 6 inches, the explosive layer distribution was 15 grams per square inch, and the spacing was 0.0059 inch. Following detonation of the explosive, the layer of aluminum was firmly bonded to the mild steel.

Example 9

A 0.010 inch tantalum layer was clad onto a 4 inch by 5 inch plate of 0.5 inch mild steel by the procedure of Example 5. The conditions were: 0.0059 inch spacing; 10 grams per square inch of explosive. An excellent clad resulted.

Example 10

The procedure of Example 5 was employed to prepare a 6 inch by 9 inch composite of 0.0625-inch "Hastalloy C" on 0.5 inch mild steel. The explosive sheet was a slightly modified version of the composition of Example 1, having a weight per unit area of 15 grams per square inch; it contained 72% red lead, 8% binder, and 20% PETN and detonated at a velocity of about 4000 meters per second. The spacing provided between the "Hastalloy C" and the mild steel layers was 0.0138 inch, and initiation of the explosive layer was accomplished, in this instance, by a line-wave generator.

Example 11

A 3 inch by 6 inch tantalum-on-copper clad assembly was prepared by using the technique of Example 5. The thickness of the tantalum layer was 0.010 inch, and the thickness of the copper layer was 0.0625 inch. The explosive weight was 10 grams per square inch, and the spacing provided was 0.0059 inch.

Example 12

A 48 inch by 96 inch stainless steel on mild steel clad was prepared by the technique of Example 5. The explosive composition was that used in Example 10, and the weight distribution was 12½ grams per square inch. A spacing of 0.0138 inch was used. The cladding layer was 0.0313 inch in thickness, and the base layer was 0.75 inch thick.

Example 13

An explosive composition containing 35% PETN, 50% red lead, and 15% of the butyl rubber-terpene resin binder of Example 1 was employed. This composition also is readily rolled into flexible sheets and has a detonation velocity of about 5000 meters per second. A mild steel plate, 10 inches by 10 inches and 0.050 inch thick, was embedded in a block of a hard gypsum cement. Above this plate was positioned in dimensional alignment a 10 inch by 10 inch by 0.050 inch plate of magnesium; the magnesium plate having several uniform surface dimples which served to support it at a distance above the steel base plate of 0.020 inch. A dimensionally conforming layer of the aforementioned explosive containing an explosive loading of 3 grams per square inch was placed on the top surface of the magnesium plate, and a commercial No. 6 electric initiator was attached to an edge of this explosive layer and subsequently initiated. Upon examination of the composite plate formed, the two layers were found to be firmly and uniformly bonded together. Microscopic examination revealed no cracks or defects in the bond, and efforts to separate the layers mechanically were unsuccessful.

Example 14

The procedure and explosive and amount thereof described in Example 13 were used to apply a 0.003-inch titanium layer to an 0.050 inch aluminum sheet. The dimensions of the layers were 10 inches by 10 inches and the spacing distance was 0.015 inch.

Example 15

An Inconel-on-mild steel composite was prepared by the procedure and explosive and amount thereof of Example 13. Both the steel and Inconel layers were 0.050 inch in thickness, and their dimensions were 10 inches by 10 inches. The spacing distance was 0.020 inch.

Example 16

A layer of 0.001-inch "Nichrome" was firmly clad to a tungsten base layer by the procedure of Example 13. The amount and explosive used was that of Example 10, and the spacing distance used was 0.003 inch. The tungsten layer was 0.050 inch thick.

Example 17

A Nichrome on molybdenum clad was prepared by the procedure of Example 16 using a 0.050 inch layer of molybdenum in place of the tungsten layer.

Example 18

A 0.003-inch clad of a 90/6/4 titanium/aluminum/vanadium alloy was applied to a 1 inch by 1 inch by 0.050 inch square of tungsten by the procedure described in Example 13. The spacing was 0.003 inch and the explosive and amount was that of Example 13. The bond formed was excellent.

Example 19

A 0.007-inch layer of an 80/10/10 alloy of niobium/titanium/molybdenum was clad to a 1 inch by 1 inch by 0.050 inch sheet of molybdenum by means of the procedure and explosive of Example 13 with a spacing of 0.010 inch.

Example 20

A molybdenum plate 0.100 inch thick and 1 inch by 4 inches was placed on a steel supporting plate. A 1 inch by 4 inch by 0.005 inch mild steel sheet was supported directly above the molybdenum plate at a distance of 0.025 inch by means of dimples in the corners of the steel sheet. A 1 inch by 4 inch layer of the explosive of Example 13 having an explosive loading of 2 grams per square inch was glued to the upper surface of the steel sheet. After initiation of the explosive at one edge the two metals were observed to be firmly bonded together, no evidence of cracking being detectable.

Example 21

A sheet of titanium 6 inches wide by 10 inches long by .008 inch thick, was rolled around a cylindrical iron mandrel with an overlap of about 1 inch. An edge of the sheet was provided with small indentations so that the two intersecting edges were separated by an air gap. A strip of the explosive of Example 13 equal in length to the length of the sheet was positioned contiguous to the overlapping edge of the sheet and initiated at one end of the strip. The titanium tube thus formed was uniform and without cracks or other imperfections. The seam was of excellent mechanical strength, and metallurgical examintion revealed no discontinuities.

Example 22

Stainless steel of 0.029 inch thickness was clad to molybdenum and to tungsten substrates by means of the procedure of Example 13 utilizing the explosive composition of Example 1. The spacing was 0.015 inch in each case, the dimensions of the metal layers were 2 inches by 2 inches, and the thicknesses of the molybdenum and tungsten base layers were 0.039 inch and 0.021 inch, respectively.

Example 23

A layer of titanium of 0.040 inch thickness was clad to Inconel by the procedure of Example 22. The Inconel base layer was 0.055 inch in thickness. The spacing was 0.015 inch and the dimensions of the layers were 2 inches by 2 inches. Good bonding was achieved.

The following Examples 24 through 33 illustrate the application of the process of the present invention in connection with the preparation of multilayered or "sandwich"-type clad systems, i.e. assemblies having more than two layers. In each of hese examples, the explosive composition used was the 70% red lead-20% PETN-10% binder composition of Example 1.

Example 24

A 6 inch by 9 inch by 0.5 inch plate of type 1015 steel was placed on a supporting block of plywood. A 0.018 inch copper layer of corresponding dimensions was placed on the steel plate supported and spaced therefrom a distance of 0.0059 inch by iron particles. Then a 0.0625 inch thick layer of stainless steel was positioned on the copper layer and also spaced therefrom a distance of 0.0059 inch by iron particles. The exposed upper surface of the stainless steel layer was covered with a protective layer of tape and then with a sheet of the explosive having a weight distribution of 10 grams per square inch. An electric initiator was attached to one corner of the explosive sheet, and the explosive was detonated. Examination of the resulting stainless steel-copper-1015 steel composite showed that firm metallurgical bonding had been produced at both interfaces. No deformation or surface distortion was detectable.

Example 25

A 6 inch by 9 inch stainless steel-copper-mild steel-yellow brass composite was prepared in the manner described in Example 24, utilizing spacing at each interface of 0.0059 inch, and an explosive distribution of 20 grams per square inch. The thicknesses of the stainless, copper, mild steel, and yellow brass layers were, respectively, 0.0625, 0.0625, 0.0625, and 0.125 inch.

Example 26

A composite, 6 inches by 9 inches, of 0.0625 inch stainless steel-on-0.0313 inch aluminum-on-0.5 inch mild steel was prepared by the procedure of Example 24. The spacing provided at each interface was 0.0059 inch and the explosive distribution was 15 grams per square inch.

Example 27

A 6 inch by 9 inch stainless steel-mild steel-brass-mild steel composite was prepared by means of the technique described in Example 24. The spacing at each interface was 0.0059 inch, the explosive distribution was 20 grams per square inch, and the thickness of the stainless steel, mild steel, brass, and mild steel layers was, respectively, 0.0625, 0.012, 0.0313, and 0.5 inch.

Example 28

A 6 inch by 9 inch, 5-layered composite article of manufacture composed of stainless steel-on-mild steel-on-copper-on-mild steel-on-stainless steel was prepared in the manner described in Example 24. The thickness of the layers was: stainless layers, 0.0625 inch; mild steel layers, 0.012 inch; copper, 0.0625 inch. The spacing between the layers was 0.0059 inch and the explosive distribution was 20 grams per square inch.

Example 29

A 12 inch square titanium-on-copper-on stainless steel composite article of manufacture was prepared as follows. A 0.0625 inch copper layer was supported on a 0.008 inch layer of stainless steel at a distance of 0.0029 inch by particles of iron powder (through No. 200 mesh, held on No. 325 mesh). Similarly, a 0.003 inch titanium layer was positioned above the copper layer at a distance of 0.0029 inch maintained by iron particles. The upper surface of the titanium was covered with polyethylene terephthalate film ("Mylar" polyester film manufactured by E. I. du Pont de Nemours & Co.) of 10 mil thickness, and the edges of the entire assembly were waterproofed by the application of tape. A sheet of the explosive, weight distribution 15 grams per square inch, was glued to the inside bottom surface of an open box designed to fit over the assembly of metal layers. The inside depth of the box was sufficient to provide a space of ¾ inch between explosive layer and titanium layer when the box was inverted and firmly fixed over the metal layers. An initiator was attached to the explosive sheet at one corner, the box positioned over the metal layers, the entire assembly was submerged in water, and the initiator was detonated. The composite formed was heated to 550° C. and held at this temperature for 10 minutes. After cooling in air to room temperature, the composite was bent 90° around a cylindrical mandrel. No cracking or separation occurred.

Example 30

The technique of Example 29 was used to prepare a 6 inch by 6 inch, 16-layered laminate composed of alternating layers of 0.005 inch mild steel and 0.005 inch austenitic stainless steel. The explosive distribution was 10 grams per square inch, and the spacing provided between each layer was 0.0059 inch. A one-inch thick water layer between the explosive and the uppermost metallic layer was employed. The laminate thus produced was uniformly bonded, and no imperfections or irregularities were observable.

Example 31

A 3 inch by 6 inch aluminum-on-copper-on-mild steel composite article of manufacture was prepared by using an explosive layer of 15 grams per square inch and a spacing (provided by uniform particles of iron powder) between each of the metallic layers of 0.0059 inch. The upper surface of the aluminum was protected by a 1-inch layer of polystyrene foam, the edges of the assembly sealed by tape, and the assembly was submerged in water when the explosive was detonated. The aluminum, copper, and mild steel layers were 0.125, 0.0625, and 0.5 inch thick, respectively.

Example 32

A tantalum-on-copper-on-mild steel composite article of manufacture 4 inches by 5 inches was prepared by using a polystyrene foam protective layer and immersing the assembly in water before shooting as described in Example 31. The spacing used was 0.0138 inch, and the explosive weight was 15 grams per square inch. The thickness of the metallic layers was: tantalum, 0.010 inch; copper, 0.0625 inch; and mild steel, 0.5 inch.

Example 33

The explosive composition of Example 1 was used to prepare a 3 inch by 6 inch silver-on-mild steel composite. The explosive distribution was 12½ grams per square inch, and the technique described in Example 29 was employed to provide a ¼-inch water layer between the explosive layer and the silver. A spacing of 0.0328 inch between the steel and silver was provided by particles of iron powder (through No. 20 mesh, held on No. 45), and initiation was accomplished by a line-wave generator.

Although we do not intend to be limited by any theory of operation, we believe the bonding phenomenon described above is attributable to a "jetting" action which occurs, as illustrated schematically in FIGURE 3. When the explosive layer is initiated, the detonation proceeds throughout the remainder of the explosive layer at the detonation velocity of the explosive composition. The pressures produced by the detonation thus act progressively on the layer of cladding material to propel it toward the material to be clad. If the layer of cladding metal is parallel to the surface of the metal to be clad, that portion of the cladding metal nearest the point or points of initiation will make contact with the surface of the metal to be clad while other portions are either stationary or enroute to the surface (see FIGURE 3). If the conditions are appropriate, a "jet" composed of surface layers of both metals will be produced, this jet being directed into the as yet unoccupied space between the layer of cladding metal and the surface of the metal being clad. The jetted material is recirculated to give intimate mixing of the two metals. The removal of the metal surface layers and the coalescence under high pressure of previously underlying metal results in the desired bonding.

Effective bonding will not be obtained if the cladding metal layer impacts in gross by travelling in a direction generally normal to the surface of the metal to be clad. Such conditions will prevail in the case of parallel metal layers in which one layer is driven by an explosive that is initiated essentially simultaneously over its entire surface, as by a plane wave generator, or if an explosive charge is positioned a substantial distance, i.e., more than a few inches, from the cladding layer and the pressure is transmitted through a relatively dense medium. In the latter case, the effect of the spacing would be to approximate simultaneous initiation over the entire surface. In order to achieve the desired result, an explosive layer must be initiated so that the detonation is propagated parallel to the cladding layer. Naturally, the dimensions of the explosive layer must correspond to the dimensions of the area where cladding is desired.

An essential and critical feature of the present invention is the use of an explosive having a detonation velocity not greater than about 120% of the velocity of sound in that metal of the system having the highest sonic velocity. By "metal" in the previous sentence, we mean metallic component or layer of the cladding system which in any instance may be either an elemental metal or a mixture of elemental metals, i.e., an alloy. When the detonation velocity of the explosive exceeds this limitation, oblique shock waves often ensue which eliminate the "jet" phenomena referred to above and prevent formation of a good metal-to-metal bond. Also, in those cases where a jet does form, pronounced secondary effects often result, such as distortion of the plates and cracking of the bonding layer.

While we have referred repeatedly hereinabove to the "velocity of sound" and the "sonic velocity" of metals, those skilled in the art will recognize that these terms have somewhat different meanings in differing circumstances. For example, these terms will have a different significance to the physicist when dealing with plastic shock wave phenomena in solids as contrasted with elastic shock wave phenomena. It is the former with which we are concerned for purposes of the present invention. The terms "velocity of sound" and "sonic velocity" as used throughout this application in connection with metals and metallic systems refer to the velocity of the plastic shock wave which forms when a stress which is applied just exceeds the elastic limit for unidimensional compression of the particular metal or metallic system involved. The value of this sonic velocity may be obtained by means of the relation $$V = \sqrt{K/d}$$

where "V" is the sonic velocity in cm./sec; "K" is the adiabatic bulk modulus in dynes/cm.²; and "d" is the density in g./cm³. Values of "K" may be obtained from values of Young's modulus, "E" and Poisson's ratio, "$\nu$" by means of the relation $$K = E/(1_{-2\nu})$$

Values of "d" and "K" or "E" and "$\nu$" are readily available in the literature (see for example American Institute of Physics Handbook, McGraw-Hill, New York, 1957).

Alternatively, the sonic velocity may be ascertained from published values of the velocity of the plastic shock wave as a function of the particle velocity imparted to the metal by the shock wave in the manner described by R. G. McQueen and S. P. Marsh, Journal of Applied Physics 31 (7), 1253 (1960).

In those cases where literature data are unavailable, values of "V" may be obtained by carrying out shock wave measurements as described by R. G. McQueen and S. P. Marsh (loc. cit.) and in references cited by them. Alternatively "V" may be ascertained from the relation $$V = \sqrt{C_L^2 - (4/3)C_s^2}$$

where "$C_L$" is the velocity of elastic compressional waves and "$C_s$" is the velocity of elastic shear waves in the metal. The required velocities of the elastic waves may be measured by well-known methods. For illustration purposes, sonic velocity values as used herein for representative metals are set forth in the following table:

| Metal: | Sonic velocity, m./sec. |
|---|---|
| Zinc | 3000 |
| Copper | 4000 |
| Magnesium | 4500 |
| Niobium | 4500 |
| Austenitic stainless steel | 4500 |
| Nickel | 4700 |
| Titanium | 4800 |
| Iron | 4800 |
| Molybdenum | 5200 |
| Aluminum | 5500 |

In addition to the maximum limitation on the detonation velocity of the explosive used, we have found that the latter must have a minimum detonation velocity of at least about 1200 meters per second. Explosive compositions which detonate at a velocity lower than this will often fail to develop the energy necessary for formation of the 'jet" postulated above, and will thus fail to firmly bond the metals within the sense and scope of the present invention.

As shown by the examples, the novel bonding process is applicable to a wide variety of metals, such as aluminum, steel, iron, titanium, niobium, chromium, cobalt, nickel, beryllium, magnesium, molybdenum, tungsten tantalum, vanadium, zirconium, silver, platinum, copper, gold, and their alloys, and other metals, many of which are very difficult to bond by any of the conventional techniques. Each of the layers may be of a single metal, or they may be alloys of two or more individual metals, or either of the layers may be a composite of two or more single layers.

Not only is the process suitable for the preparation of flat plates or sheets but also, as shown by Example 21, the preparation of tubes and other shapes from difficultly weldable material is possible. In commercial practice the base layer will often be an implement or unit of equipment to which the cladding layer is to be affixed. Generally, the bond strength will be greater than the tensile strength of the weaker metal. The ductility of the bonded material also is comparable to that of the non-bonded layers and may often times be increased by mild heat treatment.

A particularly surprising and advantageous feature of the novel clad systems of the present invention is that the continuous bonding zone joining the two layers will be of homogeneous composition throughout. In conventional cladding methods, the bonded zone is composed of a gradated sequence of compositions which are progressively richer in the metal of the layer that is closest and, conversely, progressively poorer in the layer which is farthest away. The following example illustrates this aspect of the invention.

*Example 34*

A series of 26 nickel-on-copper clads was made by using the explosive of Example 1 at a distribution of 5 grams per square inch, and the spacing between the nickel and copper layers was varied in increments from 0.0017 to 0.160 inch. The explosive sheet was spaced ¼ inch from the cladding layer and the space was filled with water according to the technique described in Example 29. The metal layers measured 4 inches by 4 inches by 0.021 inch. Subsequent X-ray diffraction studies carried out on the jetted zone of each of the clads showed that in each case was produced an identical face-centered cubic structure. The lattice parameter obtained for the jetted material was 3.575±0.003 A. regardless of the spacing employed and irrespective of the portion of the jetted zone examined. A copper-nickel composition having a lattice parameter of 3.575 A. is composed of 33% nickel and 67% copper.

The method employed to provide the required gap between the metal layers is not critical. As we have shown, tiny particles of metal interposed between the layers function quite satisfactorily. Also, small projections in the surface of the upper layer or small protrusions on the surface of the lower layer may be used. Obviously, the supporting means should not shield large areas of the surfaces of the metals if bonding at those areas is desired.

It is desirable that the metals be relatively free of surface impurities. Where surfaces are unclean, usually cleaning of the surfaces with a mild abrasive followed by flushing with a solvent is adequate to remove any impurities which would impair adhesion or result in brittle areas. However, the intense and elaborate cleaning operations required for other bonding methods are not necessary for the present process.

Rigid supporting means for the base layer is not critical to the practice of the invention; however the presence of a supporting medium aids in avoiding distortion of the assembly formed. Plywood, because of its low cost, represents a satisfactory support material.

As demonstrated in the foregoing examples, in some cases it is advantageous to provide a layer of inert or buffer material such as polyester films, water, or a thin layer of tape between the explosive layer and the surface of the cladding metal as an aid in maintaining a smooth uncontaminated surface.

The explosive layer may be initiated by any conventional initiating device, e.g., blasting cap, detonating fuse, exploding wires, etc. The location of the initiation source on the explosive layer is not critical provided that the entire layer is not simultaneously initiated. Thus the initiation source may be at a corner, which is preferred because of the larger bonded area which it provides, along an edge, or in the center of the explosive layer, or alternatively, a plurality of initiation sources or a line-wave generator may be used to initiate an entire edge of the layer simultaneously. The amount of explosive used is not critical, provided a sufficient loading is present to propel the layers with adequate velocity to achieve the desired bonding. The particular amount and loading of explosives suitable in any case will be readily apparent to one skilled in the art considering such factors as type of explosive, thickness of the metal layer, etc. Obviously, excessive explosive will cause undesired deformation and should be avoided.

Obviously, if desired, in order to conserve the amount of explosive required, a cladding assembly may be placed on both surfaces of the explosive layer. Thus, two clad systems may be prepared with a single operation. Having described the invention fully in the foregoing, we intend to be limited only by the following claims.

We claim:

1. A process for bonding together ductile metallic layers to form a multilayered body of metallic layers wherein each metallic layer is bonded to its facing layer by a substantially continuous metallurgical bond characterized by the presence of a homogeneous mixture of the metals of the respective facing layers which comprises supporting at least one metal layer separated from an adjacent metal layer by a space of at least 0.001 inch and in substantially parallel relationship thereto, placing a layer of a detonating explosive on the outside surface of one of the metal layers, said explosive having a detonation velocity of greater than 1200 meters per second but less than 120% of the sonic velocity of the metal having the highest sonic velocity in the system, and initiating said explosive so that detonation is propagated parallel to said metallic layers, the loading of said explosive being at least sufficient to produce a pressure upon collision of said metallic layers, said pressure being greater than the elastic limit of the metal having the lowest elastic limit in the system and sufficient to cause bonding between said layers.

2. A process for bonding together ductile metallic layers to form a multilayered body of metallic layers wherein each metallic layer is bonded to its facing layer by a substantially continuous metallurgical bond characterized by the presence of a homogeneous mixture of the metals of the respective facing layers which comprises supporting at least one metal layer separated from an adjacent metal layer by a space of at least 0.001 inch and in substantially parallel relationship thereto, placing a layer of a detonating explosive on the outside surface of one of the metal layers, said explosive having a detonation velocity of greater than 1200 meters per second but less than the sonic velocity of the metal having the highest sonic velocity in the system, and initiating said explosive so that detonation is propagated parallel to said metallic layers, the loading of said explosive being at least sufficient to produce a pressure upon collision of said metal layers, said pressure being greater than the elastic limit of the metal having the lowest elastic limit in the system and sufficient to cause bonding between said layers.

3. A process for bonding together ductile metallic layers to form a multilayered body of metallic layers wherein each metallic layer is bonded to its facing layer by a substantially continuous metallurgical bond characterized by the presence of a homogeneous mixture of the metals of the respective facing layers which comprises supporting at least one metal layer separated from an adjacent metal layer by a space of at least 0.001 inch and in substantially parallel relationship thereto, placing a layer of a detonating explosive on the outside surface of one of the metal layers, said explosive having a detonation velocity of from 1200 to 5500 meters per second and less than the sonic velocity of the metal having the highest sonic velocity in the system and initiating said explosive so that detonation is propagated parallel to said metallic layers, the loading of said explosive being at least sufficient to produce a pressure upon collision of said metallic layers, said pressure being greater than the elastic limit of the metal having the lowest elastic limit in the system and said pressure being sufficient to propel portions of the facing surfaces of said metallic layers into the space between said layers and to bond said layers.

4. A process according to claim 1, wherein the supported layer is supported by a plurality of projections on the surface thereof.

5. A process according to claim 1, wherein the support is provided by scattered metal particles of relatively uniform size.

6. A method according to claim 1 wherein the cladding layer and the base layer are overlapping ends of a single metal sheet whereby a vessel structure is produced.

7. A process according to claim 1 wherein the metals comprising the said metallic layers are selected from the group consisting of iron, titanium, aluminum, niobium, tantalum, chromium, cobalt, nickel, molybdenum, beryllium, tungsten, magnesium, copper, vanadium, zirconium, silver, platinum, gold, and their alloys.

8. A process according to claim 1 wherein the resultant multilayered body is given a ductility-restoring heat treatment.

9. A process according to claim 1, wherein a layer of buffer material is interposed between the explosive layer and the adjacent metallic layer.

10. A process for bonding together two ductile metallic layers of metals selected from the group consisting of iron, titanium, niobium, tantalum, nickel, magnesium, copper, zirconium and their alloys to form a multilayered body of metallic layers wherein each metallic layer is bonded to its facing layer by a substantially continuous metallurgical bond characterized by the presence of a homogeneous mixture of the metals of the respective facing layers which comprises supporting at least one metal layer separated from an adjacent metal layer by a space of about from 0.020 to 0.5 inch and in substantially parallel relationship thereto, placing a layer of a detonating explosive adjacent the outside surface of one of the metal layers, said explosive having a detonation velocity of greater than 1200 meters per second but less than the sonic velocity of the metal in the system having the higher sonic velocity, and initiating said explosive so that detonation is propagated parallel to said metallic layers, the loading of said explosive being at least sufficient to produce a pressure upon collision of said metal layers, said pressure being greater than the elastic limit of the metal in the system and sufficient to cause bonding between said layers.

11. A process of claim 10 wherein one of said layers is of steel.

12. A process of claim 11 wherein said layers are of stainless steel and mild steel.

References Cited in the file of this patent

UNITED STATES PATENTS

| | | |
|---|---|---|
| 2,654,946 | Rhodes | Oct. 13, 1953 |
| 2,691,815 | Boessenkool | Oct. 19, 1954 |
| 2,786,265 | Keay | Mar. 26, 1957 |
| 2,793,423 | Stumbock | May 20, 1957 |
| 2,809,422 | Schultz | Oct. 15, 1957 |
| 2,834,102 | Pflumm | May 13, 1958 |
| 3,015,885 | McEuen | Jan. 9, 1962 |
| 3,031,746 | Ciarleglio | May 1, 1962 |

UNITED STATES PATENT OFFICE

Certificate

Patent No. 3,137,937                                            Patented June 23, 1964

George R. Cowan, John J. Douglass and Arnold H. Holtzman

Application having been made jointly by George R. Cowan, John J. Douglass, and Arnold H. Holtzman, the inventors named in the above identified patent, and E. I. du Pont de Nemours and Company, Wilmington, Del., a corporation of Delaware, for the issuance of a certificate under the provisions of Title 35, Section 256 of the United States Code, deleting the name of John J. Douglass as a joint inventor, and a showing and proof of facts satisfying the requirements of the said section having been submitted, it is this 15th day of March 1966, certified that the name of the said John J. Douglass is hereby deleted from the said patent as a joint inventor with the said George R. Cowan and Arnold H. Holtzman.

[SEAL]

EDWIN L. REYNOLDS,
                                        *First Assistant Commissioner of Patents.*